US009182300B2

United States Patent
Themm et al.

(10) Patent No.: US 9,182,300 B2
(45) Date of Patent: Nov. 10, 2015

(54) METHOD AND SYSTEM FOR MEASURING BELT TENSION

(71) Applicant: Service Solutions U.S. LLC, Wilmington, DE (US)

(72) Inventors: Jeremy Themm, Schoolcraft, MI (US); William W. Wittliff, III, Gobles, MI (US); Reed Selkirk, Kalamazoo, MI (US); Kevin Gray, Kalamazoo, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 175 days.

(21) Appl. No.: 13/648,644

(22) Filed: Oct. 10, 2012

(65) Prior Publication Data

US 2014/0096608 A1  Apr. 10, 2014

(51) Int. Cl.
| | | |
|---|---|---|
| *G01L 1/00* | (2006.01) | |
| *G01L 1/10* | (2006.01) | |
| G01H 1/00 | (2006.01) | |
| G01H 3/00 | (2006.01) | |
| G01H 9/00 | (2006.01) | |
| G01H 11/00 | (2006.01) | |

(52) U.S. Cl.
CPC ... *G01L 1/00* (2013.01); *G01L 1/10* (2013.01); *G01L 1/103* (2013.01); *G01H 1/00* (2013.01); *G01H 3/00* (2013.01); *G01H 9/00* (2013.01); *G01H 11/00* (2013.01)

(58) Field of Classification Search
CPC ............ G01L 1/00; G01L 1/10; G01L 1/103; G01H 1/00; G01H 3/00; G01H 9/00; G01H 11/00

USPC .............. 73/579, 801, 862.41, 862.453, 160, 73/862.59

See application file for complete search history.

(56) References Cited

U.S. PATENT DOCUMENTS

| | | | |
|---|---|---|---|
| 5,435,191 A | 7/1995 | Kawachi | |
| 5,698,796 A | 12/1997 | Hirano | |
| 5,877,431 A | 3/1999 | Hirano | |
| 6,454,304 B1 | 9/2002 | Steffens | |
| 6,569,046 B1 | 5/2003 | Gregg | |
| 6,789,035 B1 * | 9/2004 | Hashimoto | 702/105 |
| 7,185,546 B2 | 3/2007 | Le | |
| 2003/0033864 A1 * | 2/2003 | Rankin | 73/118.1 |
| 2004/0066521 A1 | 4/2004 | Swab | |
| 2007/0067678 A1 * | 3/2007 | Hosek et al. | 714/25 |
| 2007/0281813 A1 * | 12/2007 | Schwarz | 474/133 |
| 2008/0102999 A1 * | 5/2008 | Yang | 474/110 |
| 2011/0173496 A1 | 7/2011 | Hosek et al. | |

FOREIGN PATENT DOCUMENTS

GB   2127544 A  *  4/1984

* cited by examiner

*Primary Examiner* — Laura Martin
*Assistant Examiner* — Rose M Miller
(74) *Attorney, Agent, or Firm* — Baker & Hostetler LLP

(57) ABSTRACT

A measuring system including a sensor positioned to a belt to measure an oscillation or vibration of the belt based at least in part on a trigger threshold. Also, the measuring system may include a diagnostic tool coupled the sensor to receive a plurality of measurements of the oscillation or vibration of the belt, wherein the diagnostic tool may determine a tension of the belt based at least in part on an average of the plurality of measurements of the oscillation or vibration of the belt.

18 Claims, 6 Drawing Sheets

METHOD AND SYSTEM FOR MEASURING BELT TENSION

FIELD OF THE DISCLOSURE

The present disclosure relates generally to a method and system for measuring belt tension. More particularly, the present disclosure relates to a method and system for measuring belt tension having a user interface.

BACKGROUND OF THE DISCLOSURE

A belt is a loop of flexible material used to mechanically link two or more rotating shafts. Belts may be used as a source of motion to efficiently transmit power, or to track relative movement. As popularity of the belts increase, more and more equipment are using the belt to provide efficient power transmission. Efficient power transmission may be accomplished by tracking the motion of individual belts of the equipment. If a belt is too loose, the belt can slip resulting in inefficient power transmission. If a belt is too tight, the bearings and pulleys on which the belts turn can burn out or the belt can tear. Thus, a system to track the belt tension is necessary in order to ensure proper operation of the belt.

Oftentimes, the belt tension may be measured by measuring the vibration frequency of the belt. The belt tension and the vibration frequency may have a correlation whereas the belt tension increases the vibration frequency also increases. Conventional stand-alone belt tension tools may be used to measure the belt tension using various methods. However, conventional stand-alone belt tension tools may be expensive and hard to use. Also, the conventional stand-alone belt tension tools may be an additional tool that adds clutter to a small working area of a user. Thus, a system that tracks the belt tension having other functions is necessary to reduce cost and clutter for a user.

Accordingly, it is desirable to provide a method and system that accurately measures the belt tension, especially for belts that are located at hard to reach places. Also, it is desirable to provide a method and system that incorporates multi-functionalities of various tools into a single system in order to reduce costs and clutter of a user.

SUMMARY OF THE INVENTION

The foregoing needs are met, to a great extent, by the present invention, wherein in one aspect an apparatus is provided that in some embodiments to provide a method and system that accurately measure a tension of a belt.

In accordance with one embodiment of the present disclosure, a measuring system may include a sensor positioned to a belt to measure an oscillation or vibration of the belt based at least in part on a trigger threshold. Also, the measuring system may include a diagnostic tool coupled the sensor to receive a plurality of measurements of the oscillation or vibration of the belt, wherein the diagnostic tool may determine a tension of the belt based at least in part on an average of the plurality of measurements of the oscillation or vibration of the belt.

In accordance with another embodiment of the present disclosure, a method may include measuring, via a sensor positioned near a belt, to measure an oscillation or vibration of the belt based at least in part on a trigger threshold. Also, the method may include receiving, via a diagnostic tool coupled the sensor, a plurality of the measurements of the oscillation or vibration of the belt, wherein the diagnostic tool determines a tension of the belt based at least in part on an average of the plurality of measurements of the oscillation or vibration of the belt.

In accordance with another embodiment of the present disclosure, a measuring system including means for measuring positioned to measure an oscillation or vibration of a belt based at least in part on a trigger threshold. Also, the measuring system may include means for processing coupled the means for measuring to receive a plurality of measurements of the oscillation or vibration of the belt, wherein the means for processing may determine a tension of the belt based at least in part on an average of the plurality of measurements of the oscillation or vibration of the belt.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
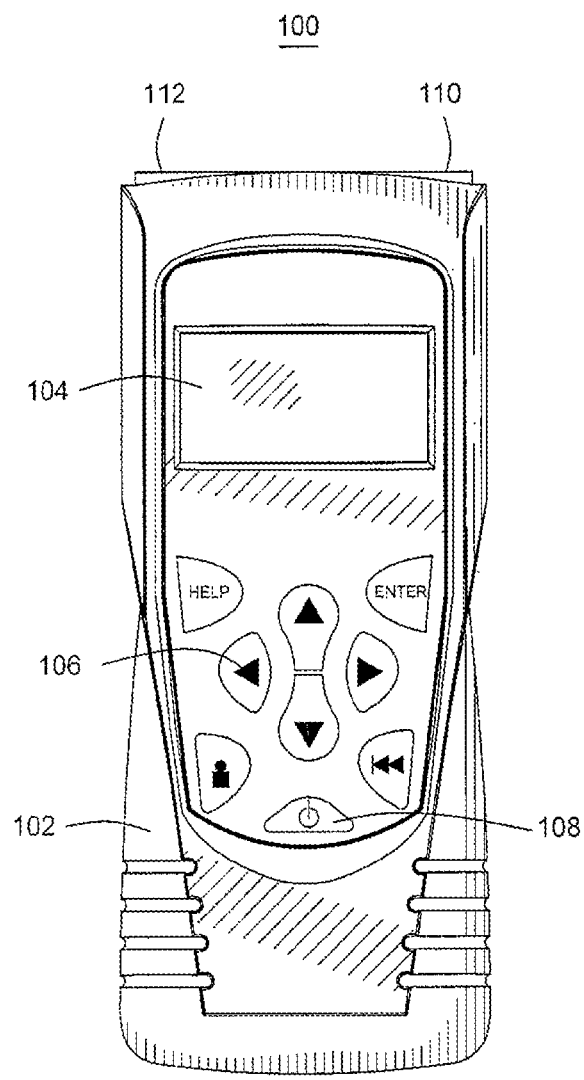
FIG. 1 depicts a front view of a diagnostic tool according to an exemplary embodiment of the invention.

The invention will now be described with reference to the drawing figures, in which like reference numerals refer to like parts throughout. An embodiment in accordance with the present invention provides a multi-functional system having an interface that enables a user to measure the belt tension of a belt. The interface may allow the user to choose various functions performed by the multi-functional system and provide user instructions for performing the measurement of belt tension. Also, the multi-functional system may provide an accurate measurement of the belt tension based at least in part on a plurality of belt tension measurements.

An embodiment of the present inventive system is illustrated in FIG. 1. In particular, FIG. 1 is a front view illustrating a diagnostic tool 100 according to an embodiment of the invention. The diagnostic tool 100 may be implemented on computing devices or mobile devices. The diagnostic tool 100 may be any computing device, including a computer, a personal computer, a laptop, a cellular communication device, a workstation, a mobile device, a smart phone, a television, a handheld tablet, a personal digital assistant (PDA), a thin system, a fat system, a network appliance, an Internet computing device, or other any other device. The diagnostic tool 100 may include software implemented on the computing device in order to measure a tension of a belt. In another example, the diagnostic tool 100 may be, for example, the Genisys® diagnostic tool from Service Solutions (a unit of the SPX Corporation) in Owatonna, Minn. or EliteAutoscanner® Pro CP9190 from Actron (a unit of Service Solutions).

The diagnostic tool 100 may be a computing device that may include a housing 102 to house the various components of the diagnostic tool, such as a display 104, a user interface 106, a power key 108, a memory card reader 110 (optional) and a connector interface 112. The display 104 can be any display, for example, a liquid crystal display (LCD), a video graphics array (VGA), a touch display (which can also be a user interface), etc. The user interface 106 allows the user to interact with the diagnostic tool in order to operate the diagnostic tool as desired. The user interface 106 can include function keys, arrow keys or any other type of keys that can manipulate the diagnostic tool 100 in order to operate various menus that are presented on the display. The input device 106 can also be a mouse or any other suitable input device, including a keypad, or a scanner. The user interface 106 can also include numbers or be alphanumeric. The power key 108 allows the user to turn the diagnostic tool 100 on and off, as required.

Memory card reader 110 can be a single type card reader for a memory card, such as a compact flash card, floppy disc, memory stick, secure digital memory, flash memory or other types of memory. The memory card reader 110 can be a reader that reads more than one of the aforementioned memory such as a combination memory card reader. Additionally, the memory card reader 110 can also read any other computer readable medium, such as CD, DVD, UMD, etc.

The connector interface 112 allows the diagnostic tool 100 to connect to an external device, such as an ECU of a vehicle (via a data link connector), a sensor, a computing device, an external communication device (such as a modem), a network, etc. through a wired or wireless connection. Connector interface 112 can also include a USB, FIREWIRE, modem, RS232, RS485, and other connections to communicate with external devices, such as a hard drive, USB drive, CD player, DVD player, UMD player or other computer readable medium devices.

Figure 2:
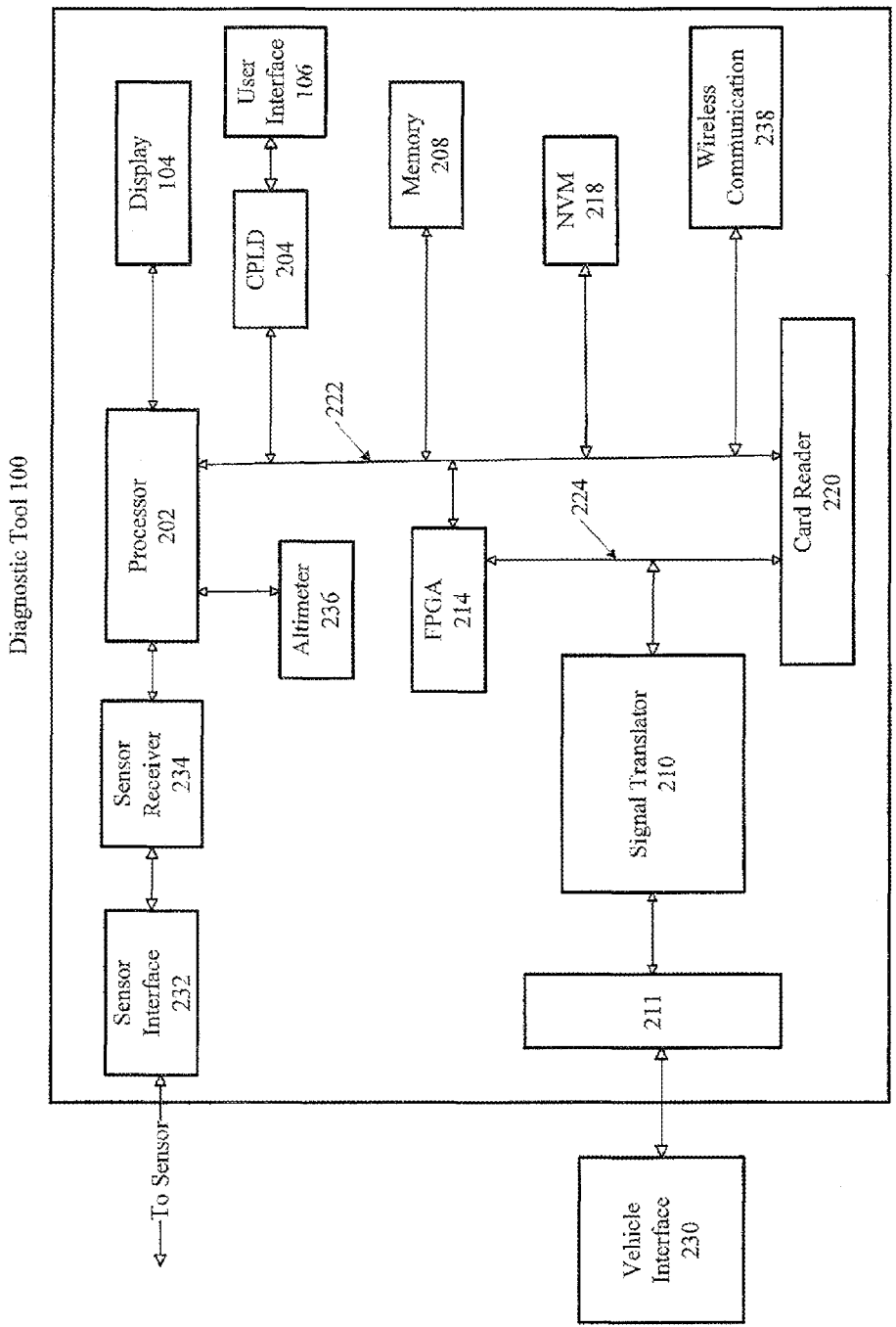
FIG. 2 depicts components of a diagnostic tool according to an exemplary embodiment of the invention.

FIG. 2 is a block diagram of the components of the diagnostic tool 100 according to an embodiment of the invention. In FIG. 2, the diagnostic tool 100 according to an embodiment of the invention includes a processor 202, a field programmable gate array (FPGA) 214, a first system bus 224, the display 104, a complex programmable logic device (CPLD) 204, the user interface in the form of a user interface 106, a memory subsystem 208, an internal non-volatile memory (NVM) 218, a card reader 220, a second system bus 222, a connector interface 211, a selectable signal translator 210, a sensor interface 232, a sensor receiver 234, an optional altimeter 236 and wireless communication circuit 238. A vehicle communication interface 230 is in communication with the diagnostic tool 100 through connector interface 211 via an external cable (not shown).

Selectable signal translator 210 communicates with the vehicle communication interface 230 through the connector interface 211. Signal translator 210 conditions signals received from an ECU unit through the vehicle communication interface 230 to a conditioned signal compatible with diagnostic tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that is provided by diagnostic tool 100 to communicatively connect diagnostic tool 100 to vehicle communication interface 230. Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of diagnostic tool 100 and also provides glue-logic for various other interfacing tasks.

Memory subsystem 208 and internal non-volatile memory (NVM) 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software to run the diagnostic tool 100 can be stored in the memory subsystem 208, including any database. The database may include data for calculating and determining belt tension of various belts. The database may include belt specifications of various belts used in a plurality type of vehicles. For example, the database may include information about various belt types, mass/weights, width, speed, pulley diameters, and tension values of various belts used in different vehicles. The database may also include data for tuning or servicing (including diagnosing) a vehicle at various altitudes or regions. Because vehicles run differently (for example, oxygen levels vary at different altitudes) at different altitudes or regions, moving a vehicle (such as a racing vehicle) from one altitude to another or from one region (hot) to another region (cold) will require tuning the vehicle to that changed altitude and/or region as discussed below. The database can also be stored on an external memory, such as a compact flash card or other memories.

The database also includes a diagnostic database that can communicate with a belt database, discussed below. By accessing the belt database, the diagnostic tool 100 can automatically access belt specifications (e.g., without technician input) to determine a tension of a belt.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

The sensor interface 232 and sensor receiver 234 may be mounted in or on the housing 102 or any combination thereof. The sensor interface 232 may be electronically coupled to the sensor receiver 234 and allows the sensor receiver 234 to communicate (detects and decodes signals) with various signals of different sensors. The sensor interface 232 may provide a unified interface with various types of sensors. For example, the sensor interface 232 may provide a unified interface with an acoustic sensor, an optical sensor, and/or an inductive sensor. The sensor interface 232 may receive various signals from different types of sensors containing information representative of an oscillation or vibration of a belt under service. Various signals may be in the form of an optical or electrical signal and may be either digital or analog signals depending on the sensor detecting the oscillation or vibration of the belt. The sensor receiver 234 may process the various received signals into a standard format for further processing. For example, the sensor receiver 234 may process an optical signal into an electrical signal for further processing, and vice versa. Also, the sensor receiver 234 may process an analog signal into a digital signal for further processing, and vice versa.

The sensor receiver 234 may be electronically coupled to the processor 202, which may be coupled to memory 208, non-volatile memory (NVM) 218 or a memory card in the card reader 220. The sensor receiver 234 may provide the received signal to the processor 202. The processor 202 may process the received signal to determine a tension of the belt to be serviced and produce an output for the display 104. The memory 208 can be used to store belt specification data, such as belt type, belt tension, run in belt, mass/weight and/or other characteristics of various belts. The diagnostic tool 100 can include information for all the belts for different models and years of vehicles by domestic and foreign manufacturers. The database may also store data of a plurality of belt tension measurements. In an exemplary embodiment, the database may store data of five consecutive belt tension measurements.

The altimeter 236 may be used to determine the altitude of the diagnostic tool 100. The altimeter 236 may be electronically coupled to the processor 202 and can provide the altitude or elevation of the diagnostic tool 100. The altimeter 236 may be coupled to a barometric pressure sensor (not shown) in order to calibrate the elevation measurements determined by the altimeter 236. The barometric pressure sensor can be positioned interior or exterior to the housing of the diagnostic tool 100. Minor atmospheric pressure changes can affect the accuracy of the altimeter 236, thus, diagnostic tool 100 can correct for these changes by using the barometric pressure sensor in conjunction with the altimeter 236 along with a correction factor.

Wireless communication circuit 238 communicates with the processor via second bus system 222. The wireless communication circuit 238 may be configured to communicate to RF (radio frequency), satellites, cellular phones (analog or digital), Bluetooth®, Wi-Fi, Infrared, Zigby, Local Area Networks (LAN), WLAN (Wireless Local Area Network), or other wireless communication configurations and standards. The wireless communication circuit 238 may allow the diagnostic tool 100 to communicate with other devices wirelessly. The wireless communication circuit 238 may include an antenna built therein and being housed within the housing 102 or can be externally located on the housing 102.

A diagnostic tool software may be installed to operate the diagnostic tool 100 (e.g., processor 202) to perform the various diagnostic tests. Also, the diagnostic tool program may be installed on a computer device of the user to operate the computer device to perform the various diagnostic tests. Different vehicle manufactures (or even within the same manufacture) may require the diagnostic tool 100 to operate using different programs and communication protocols. The diagnostic tool 100 may determine whether it is operating the correct software or program for a particular vehicle by comparing the vehicle type with the program currently running on the diagnostic tool 100. The vehicle type may be inputted into the diagnostic tool 100 through the user interface 106 in a manner such as, for example, scanning a bar coded VIN number located on the vehicle to be serviced, reading a radio frequency identification (RFD) device, or communicating with a wireless device of the vehicle. Also, the vehicle type may be manually inputted into the diagnostic tool 100 through the user interface in a manner such as, manually enter the VIN number. From the vehicle information, the diagnostic tool 100 can then determine whether it is presently running the necessary program to service the vehicle.

The diagnostic tool 100 (e.g., via the processor) may determine the belts installed on the vehicle based at least in part on the received VIN number. The diagnostic tool 100 may display information about the belts installed on the vehicle via the display 104. A user may use the user interface 106 to select the belt to be serviced or measured. For example, the user may use the user interface 106 to scroll to the belt that is to be serviced or measured. The diagnostic tool 100 may provide belt specification based at least in part on the belt selected by the user.

Figure 3:
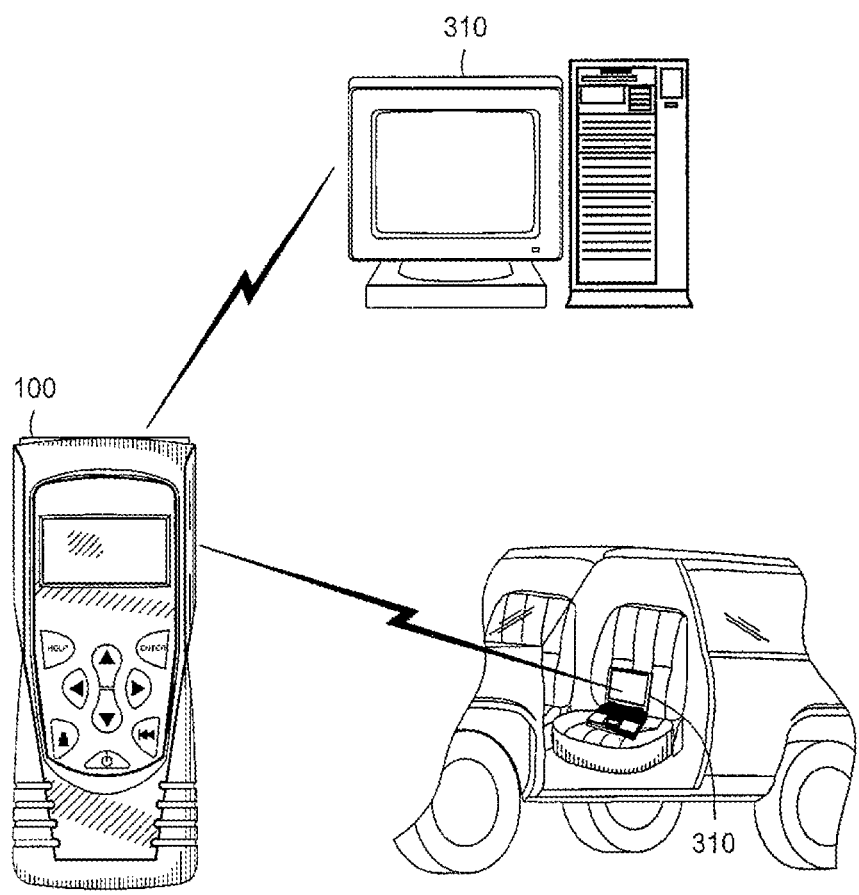
FIG. 3 depicts a diagnostic tool in communication with remote computing device according to an exemplary embodiment of the invention.

FIG. 3 illustrates the diagnostic tool wirelessly communicating with a remote computer according to an embodiment of the invention. The diagnostic tool 100 may serve as an interface between the sensors for detecting an oscillation and vibration of a belt to be serviced and a remote computing device 310. The diagnostic tool 100 may communicate with the remote computing device 310 via the wireless communication circuit 238. The diagnostic tool 100 may process the diagnostic information received from the sensor and communicate the processed diagnostic information to the remote computing device 310 in a format (e.g., protocol) corresponding to the remote computing device to be displayed (e.g., human readable form). In one embodiment, the diagnostic tool 100 can be used in and around a service station, while communicating with a remote computing device 310 located inside the service station to obtain the proper diagnostic tool program and/or diagnostic information. The diagnostic tool 100 may transfer diagnostic information to the remote computing device 310 to be displayed. In another embodiment, the diagnostic tool 100 can be used to communicate with a remote computing device 310 by wirelessly accessing the Internet to obtain the proper diagnostic tool program and/or diagnostic information.

In still another embodiment, the diagnostic tool 100 can be used in and around a tow-truck or other service vehicle that is responding to a call away from the service station. In this embodiment, the diagnostic tool 100 would communicate with a remote computing device 310 located inside or near the tow-truck or other service vehicle to obtain the proper diagnostic too software and/or diagnostic information. Also, the diagnostic tool 100 would communicate with the remote computing device 310 located inside or near the tow-truck or other service vehicles to display the measurement or service information to the user.

Figure 4:
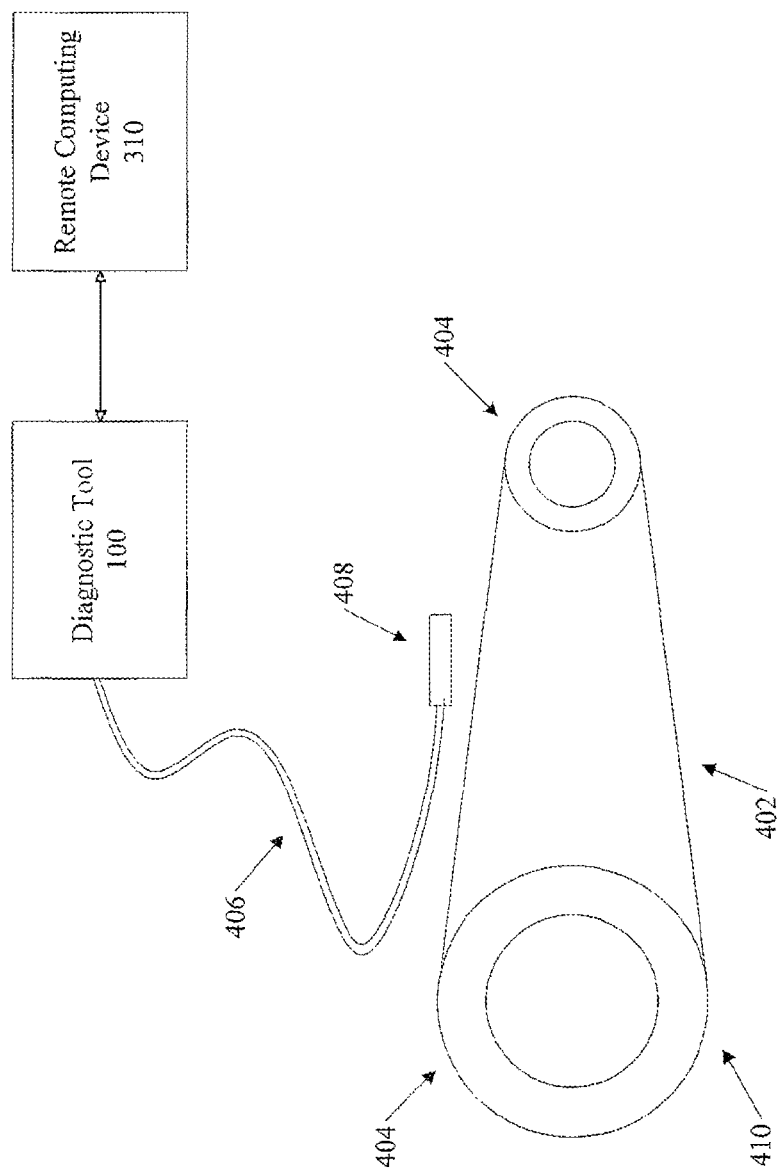
FIG. 4 depicts a diagnostic tool measuring a belt tension according to an exemplary embodiment of the invention.

FIG. 4 illustrates a schematic diagram of a diagnostic tool 100 measuring a belt tension of a belt according to an exemplary embodiment of the invention. A belt 402 under tension may couple the two end points 402 and 404 of a pulley system 410 to each other. A sensor 408 may be communicatively coupled to the diagnostic tool 100 via a connector 406. The diagnostic tool 100 may be coupled to the remote computer device 310 to measure a tension of the belt 402 and display the measurements to the user. The diagnostic tool 100 may be preconditioned to measure a tension of the belt 402 in order to eliminate distortions of the measurement. For example, a user may input a trigger threshold into the diagnostic tool 100 via the keypad 106. The diagnostic tool 100 may measure the tension of the belt 402 above the trigger threshold amplitude of the frequency. In an exemplary embodiment, the trigger threshold amplitude of the frequency may be configured to be approximately same or above the background distortion, ambient distortion, machine distortion or other environmental distortion amplitude that may alter the measurement of the tension of the belt 402. In another exemplary embodiment, the trigger threshold amplitude of the frequency may be configured to be a range of amplitudes of the frequency centered around a resonant frequency.

In an exemplary embodiment, the user may input a trigger threshold amplitude frequency into the diagnostic tool 100 via the keypad 106. The diagnostic tool 100 may detect the background noise, ambient noise, machine noise or other environmental noises that may alter the measurement of the tension of the belt 402 and automatically configure a trigger threshold amplitude frequency based on the measurement. The diagnostic tool 100 may instruct the sensor 408 to measure an amplitude of the frequency of the oscillation or vibration of the belt 402 above the trigger threshold amplitude frequency in order to achieve an accurate measurement of the oscillation or vibration of the belt 402. In another example, the diagnostic tool 100 (e.g., sensor receiver 234) may process (e.g., filter) the received signals from the sensor 408 to eliminate the amplitude of the frequency below the trigger threshold amplitude frequency.

In another exemplary embodiment, the user may input a trigger threshold amplitude wavelength into the diagnostic tool 100 via the keypad 106. The diagnostic tool 100 may measure an amplitude of the wavelength of distortion caused by light source, refraction or reflection of light beams caused by different mediums and/or other distortions and automatically configure the trigger threshold amplitude wavelength based on the measurement. The diagnostic tool 100 may instruct the sensor 408 to measure an amplitude of the wavelength reflected from the belt 402 above the trigger threshold amplitude wavelength in order to achieve an accurate measurement of the vibration of the belt 402. In another example, the diagnostic tool 100 (e.g., sensor receiver 234) may process (e.g., filter) the received optical signal from the sensor 408 to eliminate the wavelengths below the trigger threshold wavelength. In other examples, the diagnostic tool 100 may instruct the sensor 408 to measure a range of amplitude of the wavelength reflected from the belt 402 centered around a resonant wavelength.

In an exemplary embodiment, the user may input a trigger threshold amplitude of magnetic field into the diagnostic tool 100 via the keypad 106. The diagnostic tool 100 may measure an amplitude of the magnetic field of background magnetic field, machine magnetic field or other ambient magnetic field that may alter the measurement of the tension of the belt 402 and automatically configure the trigger threshold amplitude of the magnetic field based on the measurement. For example, the diagnostic tool 100 may instruct the sensor to measure an amplitude of the magnetic field of the belt 402 above the trigger threshold amplitude of the magnetic field in order to achieve an accurate measurement of the vibration of the belt 402. In another example, the diagnostic tool (e.g., sensor receiver 234) may process (e.g., filter) the received signal from the sensor 408 to eliminate the amplitude of the magnetic field below the trigger threshold magnetic field.

The sensor 408 may be an acoustic sensor. The acoustic sensor 408 may be comprised of different sizes and profiles. The acoustic sensor 408 may be a microphone, transducer, or other acoustic detection devices that may detect an amplitude of the frequency of the oscillation or vibration of the belt 402. In an exemplary embodiment, the acoustic sensor 408 may have a "U-shaped" or a "C-shaped" profile that may be positioned over or proximate to the belt 402. For example, the belt 402 may be strummed by a user or an object to create a measurable oscillation or vibration. The acoustic sensor 408 may detect the oscillation or vibration of the belt 402 in order to determine a tension of the belt 402. The acoustic sensor 408 may measure an amplitude of the frequency of the oscillation or vibration of the belt 402 above the trigger threshold amplitude set by the user. The acoustic sensor 408 may convert the detected acoustic wave into output signals containing information representative of the oscillation or vibration of the belt 402 in order to determine the tension of the belt 402. The diagnostic tool 100 may calculate an amplitude of the frequency of the oscillation or vibration of the belt 402 using various formulas. For example, the diagnostic tool 100 may use the formula as indicated below:

$$T = 4 \times M \times W \times S^2 \times f^2 \times 10^{-9} \quad (1)$$

where, T represents belt span tension (Newtons), M represents belt mass constant (g/m), W represents belt width (mm) or number of belt strands, S represents length of the span to be measured (mm) and f represents natural frequency of the belt (Hz). Also, the diagnostic tool 100 may use another formula as indicated below:

$$T = K \times S^2 \times M \times f^2; \quad (2)$$

where, T represents tension of a belt, K represents a constant, S represents a span length of the belt, M represents a unit weight or mass of the belt, and f represents a resonance vibration frequency of the belt 402.

The belt 402 may be strummed repeatedly to measure the oscillation or vibration of the belt 402 repeatedly. For example, the diagnostic tool 100 may receive a plurality of oscillation or vibration signals from the acoustic sensor 408 via the sensor interface 232 and/or the sensor receiver 234 (shown in FIG. 2). The diagnostic tool 100 may determine the tension of the belt 402 based at least in part on the plurality of measured oscillation or vibration of the belt 402. For example, the plurality of measured oscillation or vibration of the belt 402 may be samples taken (randomly sampled or sampled at a predetermined rate, $1^{St}, 3^{rd} 5^{th}$, etc.) from a group of oscillation or vibration measurements taken by the diagnostic tool 100. For example, the diagnostic tool 100 may determine an average oscillation or vibration of the plurality of measured oscillation or vibration of the belt 402. The diagnostic tool 100 may determine a tension of the belt 402 based at least in part on the average oscillation or vibration of the plurality of measurements of the belt 402.

In another example, the sensor 408 may be an optical sensor. The optical sensor 408 may be comprised of different sizes and profiles. In an exemplary embodiment, the optical sensor 408 may include an invisible infrared beam device, a LED beam device or other optical beams to detect an oscillation or vibration of the belt 402. In another exemplary embodiment, the optical sensor 408 may be a light receiver, a photo detector, a photo transistor and/or other optical detector devices to collect light beams scattered by the belt 402. For example, an optical reflector (not shown) may be coupled to the belt 402, and the belt 402 may be strummed to create a measurable oscillation or vibration and the optical sensor 408 may collect light waves reflected from the belt 402 to detect the oscillation or vibration of the belt 402. The optical sensor 408 may collect light signals having an amplitude wavelength above the trigger threshold amplitude wavelength set by the user. The optical sensor 408 may convert the detect light signals into output signals containing information representative of the oscillation or vibration of the belt 402 in order to determine a tension of the belt 402. Similarly as described above, a plurality of oscillation or vibration measurements may be received from the optical sensor 408 via the sensor interface and/or the sensor receiver 234 to determine an average of the plurality of oscillations or vibration measurements.

In other examples, the sensor 408 may be an inductive sensor. The inductive sensor 408 may be comprised of different sizes and profiles. The inductive sensor 408 may be an electromagnetic device or permanent magnet that may generate a magnetic field to detect the oscillation or vibration of the belt 402. For example, a magnet may be coupled to the belt 402 and the belt 402 may be strummed to create a measurable an amplitude of the magnetic field that may represent an oscillation or vibration of the belt 402. The inductive sensor 408 may detect the amplitude of the magnetic field that may represent the oscillation or vibration of the belt 402 in order to determine the tension of the belt 402. The inductive sensor 408 may measure an amplitude of the magnetic field of the oscillation or vibration of the belt 402 above the trigger threshold magnetic field set by the user. The inductive sensor 408 may convert the detected amplitude of the magnetic field into output signals containing information representative of the oscillation or vibration of the belt 402 in order to determine the tension of the belt 402.

Figure 5:
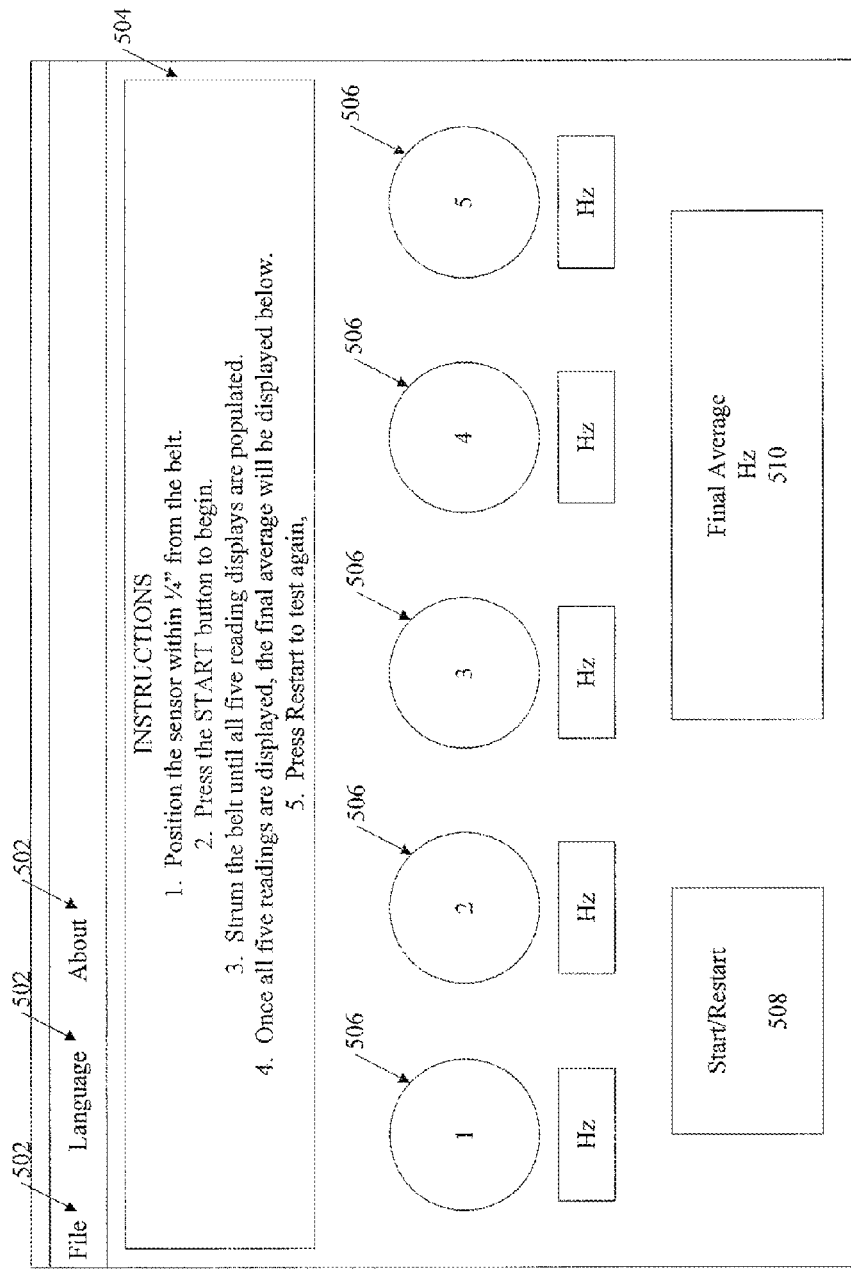
FIG. 5 depicts a graphical user interface (GUI) of the diagnostic tool according to an exemplary embodiment of the invention.

FIG. 5 illustrates a screenshot of a graphical user interface (GUI) of a diagnostic tool 100 or a remote computer device 310 according to an embodiment of the invention. For example, the screenshot of a graphical user interface (GUI) 500 may be displayed on the display 104 of the diagnostic tool 100. In another exemplary embodiment, the screenshot of a graphical user interface (GUI) 500 may be displayed on the remote computer device 310. The graphical user interface (GUI) 500 may include a plurality of control pull-down menus 502, an instruction display 504, a plurality of oscillation or vibration measurements 506, a Start/Restart button 508 and an average of the plurality of oscillation or vibration measurements 510. In an exemplary embodiment, the plurality of control pull-down menus 502 may include a "File" control pull-down menu, a "Language" control pull-down menu and an "About" control pull-down menu. Each of the plurality of control pull-down menus 502 may also include a plurality of control instructions.

The instruction display 504 may include a plurality of instructions to a technician for measuring a tension of a belt 402. For example the instruction display 504 may include a plurality of steps or procedures for performing a measurement of a tension of a belt 402. In an exemplary embodiment, the instruction display 504 may include a step of positioning the sensor (e.g., "position the sensor within ¼ inch from the belt"). The instruction display 504 may also include a step of when to start or restart a measurement of an oscillation or vibration of the belt (e.g., "press the START button to begin" or "press Restart to test again"). For example, the diagnostic tool 100 may measure an oscillation or vibration of the belt above a trigger threshold. The instruction display 504 may further include actions taken by a technician (e.g., "strum the belt until all five readings are populated"). In addition the instruction display 504 may include calculating an average of a plurality of oscillation or vibration measurements (e.g., "once all five readings are displayed, the final average will be displayed below").

The plurality of oscillation or vibration measurements 506 detected by the sensor 408 may be stored at the diagnostic tool 100. Also, the plurality of oscillation or vibration may be provided to the remote computing device 310 (as shown in FIG. 3) in order to determine the tension of a belt 402. The diagnostic tool 100 may display the plurality of oscillation or vibration measurements detected by the sensor 408. In an exemplary embodiment, the plurality of oscillation or vibration measurements 506 may include five oscillation or vibration measurements of a belt 402. The oscillation or vibration measurements of a belt 402 may be measured in hertz (Hz) or micrometer (μm), or magnetic field (Teslas). The average of the plurality of oscillation or vibration measurements 510 may be displayed to ensure accuracy of the measurement of oscillation or vibration of the belt. Also, a Start/Restart button 508 may start or restart the test of oscillation or vibration of the belt 402.

Figure 6:
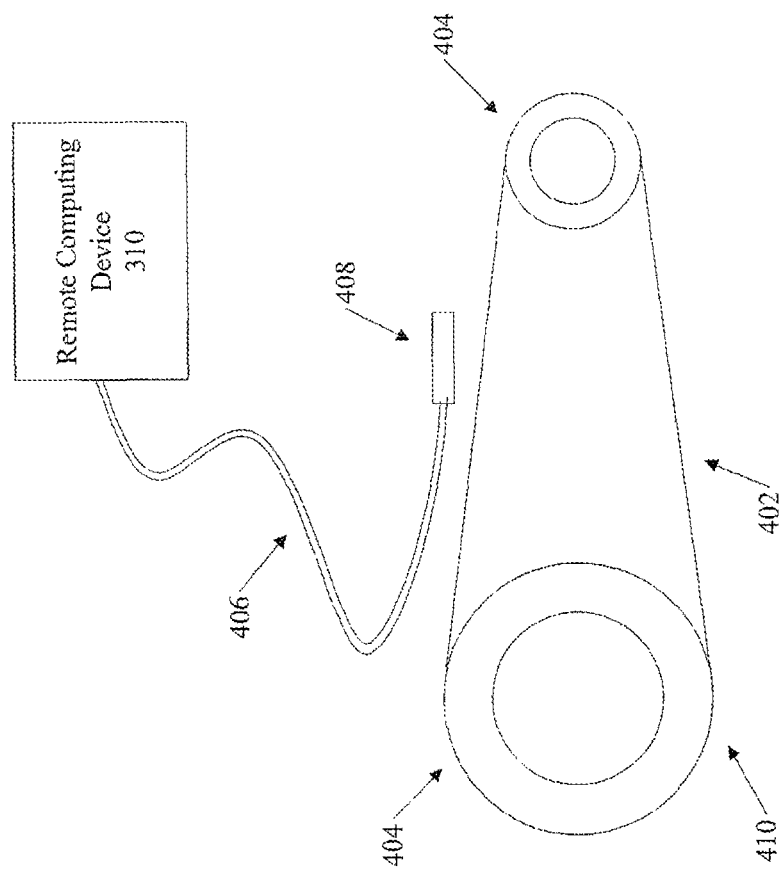
FIG. 6 depicts a remote computing device measuring a belt tension according to another exemplary embodiment of the invention.

FIG. 6 illustrates a schematic diagram of a remote computing device 310 measuring a belt tension of a belt according to an exemplary embodiment of the invention. The schematic diagram of FIG. 6 is similar to the schematic diagram of FIG. 4, except that the sensor 408 may be communicatively coupled to the remote computing device 310 via a connector 406 to measure a tension of the belt 402 and display the measurements to the user. The remote computing device 310 may include similar components (as shown in FIG. 2) that perform similar functions as described above for the diagnostic tool 100. For example, the remote computing device 310 may measure the tension of the belt 402 above trigger threshold amplitude of the frequency. The remote computing device 310 may determine the tension of the belt 402 based at least in part on the plurality of measured oscillation or vibration of the belt 402. For example, the remote computing device 310 may determine an average oscillation or vibration of the plurality of measured oscillation or vibration of the belt 402. The remote computing device 310 may determine a tension of the belt 402 based at least in part on the average oscillation or vibration of the plurality of measurements of the belt 402.

The various embodiments herein can be implemented and configured on the diagnostic tool 100 by the user. The diagnostic tool 100 may have security features such as password protection or biometric (such as fingerprint) detection so that only the user can change the configuration. Also, the user may configure various measurement functionality of the diagnostic tool 100 that best suits his needs.

Although a vehicle diagnostic tool 100 has been described herein, the embodiments herein may be used with other types of diagnostic tools 100 including vehicle connector interface (VCI). The VCI may not include a screen or a user input. However, the various functionalities, for example, may still be implemented and the user input may be coupled to the VCI or the VCI may be coupled to a computing device so that the VCI may be programmed via the computing device's user interface.

With the various embodiments described herein, various benefits are bestowed on the user/technician, the vehicle owner and/or the shop owner. By implementing these safety features, the user may be kept safe and the customer satisfied with the service. Further, the various embodiments can help enhance the reputation and integrity of the repair shop or dealership.

The many features and advantages of the invention are apparent from the detailed specification, and thus, it is intended by the appended claims to cover all such features and advantages of the invention which fall within the true spirit and scope of the invention. Further, because numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A measuring system, comprising:
    a sensor positioned near a belt to measure an oscillation or vibration of the belt based at least in part on a trigger threshold, wherein the sensor measures at a random sampling rate; and
    a diagnostic tool coupled the sensor to receive a plurality of the measurements of the oscillation or vibration of the belt, wherein the diagnostic tool determines a tension of the belt based at least in part on an average of the plurality of measurements of the oscillation or vibration of the belt and measures an environment of the sensor, and wherein the diagnostic tool retrieves a belt specification, and the trigger threshold is automatically determined by the diagnostic tool based on the measured environment of the sensor.

2. The measuring system of claim 1, wherein the sensor is an optical sensor.

3. The measuring system of claim 2, wherein the optical sensor comprises at least one of an invisible infrared beam device, a LED beam device, a light receiver, a photo detector, or a photo transistor.

4. The measuring system of claim 1, wherein the sensor is an acoustic sensor and the acoustic sensor is a microphone.

5. The measuring system of claim 1, wherein the sensor is an inductive sensor and the inductive sensor is an electromagnetic device to generate a magnetic field.

6. The measuring system of claim 1, wherein the trigger threshold is a trigger threshold amplitude of frequency.

7. The measuring system of claim 1, wherein the trigger threshold is a trigger threshold amplitude of wavelength.

8. The measuring system of claim 1, wherein the trigger threshold is a trigger threshold amplitude of magnetic field.

9. The measuring system of claim 1, wherein the diagnostic tool receives an output signal comprising information associated with the measurement of the oscillation or vibration of the belt.

10. The measuring system of claim 9, wherein the output signal is an optical output signal.

11. The measuring system of claim 9, wherein the output signal is an electrical output signal.

12. A method, comprising:
    measuring, via a sensor positioned near a belt, an oscillation or vibration of the belt based at least in part on a trigger threshold, wherein the measuring is at a random sampling rate;
    retrieving, via a processor of a diagnostic tool, a specification of the belt;
    measuring an environment of the sensor; and
    receiving, via the diagnostic tool coupled the sensor, a plurality of the measurements of the oscillation or vibration of the belt, wherein the diagnostic tool determines a tension of the belt based at least in part on an average of the plurality of measurements of the oscillation or vibration of the belt, wherein the trigger threshold is automatically determined by the diagnostic tool based on the measured environment of the sensor.

13. The method of claim 12, wherein the sensor is at least one of an optical sensor, an acoustic sensor and an inductive sensor.

14. The method of claim 12, wherein the trigger threshold is a trigger threshold amplitude of frequency.

15. The method of claim 12, wherein the trigger threshold is a trigger threshold amplitude of wavelength.

16. The method of claim 12, wherein the trigger threshold is a trigger threshold amplitude of magnetic field.

17. The method of claim 12, wherein receiving a plurality of measurements comprises receiving an output signal comprising information associated with the measurement of the oscillation or vibration of the belt.

18. A measuring system, comprising:
    means for measuring positioned to measure an oscillation or vibration of a belt based at least in part on a trigger threshold, wherein the means for measuring measures at a random sampling rate; and
    means for processing coupled the means for measuring to receive a plurality of measurements of the oscillation or vibration of the belt, wherein the means for processing determines a tension of the belt based at least in part on an average of the plurality of measurements of the oscillation or vibration of the belt and measures an environment of the means for measuring, and wherein the means for processing retrieves a belt specification, and the trigger threshold is automatically determined by the means for processing based on the measured environment of the means for measuring.

* * * * *